(12) United States Patent
Nakahara

(10) Patent No.: US 7,502,065 B2
(45) Date of Patent: Mar. 10, 2009

(54) FOCUS DETECTION METHOD AND FOCUS DETECTION APPARATUS

(75) Inventor: Naoto Nakahara, Saitama (JP)

(73) Assignee: Hoya Corporation, Tokyo (JP)

( * ) Notice: Subject to any disclaimer, the term of this patent is extended or adjusted under 35 U.S.C. 154(b) by 542 days.

(21) Appl. No.: 11/152,065

(22) Filed: Jun. 15, 2005

(65) Prior Publication Data

US 2005/0280735 A1   Dec. 22, 2005

(30) Foreign Application Priority Data

Jun. 16, 2004 (JP) .............................. 2004-178727

(51) Int. Cl.
*H04N 5/232* (2006.01)
(52) U.S. Cl. .................... 348/353; 348/354; 348/356
(58) Field of Classification Search ................ 348/345, 348/349, 353, 354, 355, 356
See application file for complete search history.

(56) References Cited

U.S. PATENT DOCUMENTS

| 5,212,516 A | * | 5/1993 | Yamada et al. ............. 348/354 |
| 2004/0202461 A1 | | 10/2004 | Nakahara |
| 2004/0233320 A1 | * | 11/2004 | Watanabe .................... 348/354 |
| 2004/0257461 A1 | * | 12/2004 | Toyomura .................... 348/345 |

FOREIGN PATENT DOCUMENTS

JP    2001-249267    9/2001

OTHER PUBLICATIONS

English Language Abstract of JP 2001-249267.
English Language Abstract of JP 2001-249267, Sep. 14, 2001.

* cited by examiner

*Primary Examiner*—David L Ometz
*Assistant Examiner*—Dillon Durnford-Geszvain
(74) *Attorney, Agent, or Firm*—Greenblum & Bernstein, P.L.C.

(57) ABSTRACT

A focus detection apparatus includes a focusing lens group, and a controller. The controller establishes a first predetermined number and a first criterial value if a maximum contrast value and/or minimum contrast value is outside a predetermined range, and a second predetermined number and second criterial value if the maximum and minimum contrast values are within the predetermined range; compares contrast values detected at adjacent positions to determine whether the contrast value of the object image increases once and subsequently decreases by the first or second predetermined number of times; detects a maximum contrast value if the contrast value of the object image increases once and subsequently decreases by the first or second predetermined number of times; determines a difference between the maximum contrast value and a detected contrast value; and selects the maximum contrast value if the difference exceeds the first/second criterial value.

8 Claims, 9 Drawing Sheets

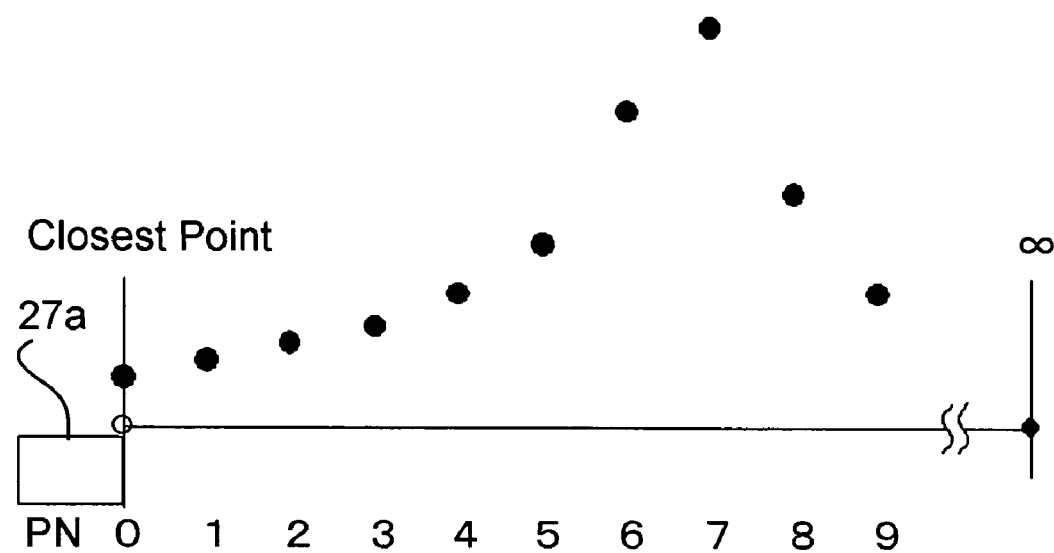

FOCUS DETECTION METHOD AND FOCUS DETECTION APPARATUS

BACKGROUND OF THE INVENTION

1. Field of the Invention

The present invention relates to a focus detection method for detecting the focus state of a digital camera on an object in accordance with the contrast of an image thereof captured by the digital camera. The present invention also relates to a focus detection apparatus using such a focus detection method.

2. Description of the Related Art

A contrast detection method is known as a conventional focus detection method for compact AF digital cameras. Conventional focus detection apparatuses using the contrast detection method operate to determine the position of a focusing lens group in which contrast of an object image captured by an image pickup device becomes maximum. Therefore, in such conventional focus detection apparatuses, an imaging operation is performed successively at different positions of the focusing lens group while the focusing lens group is driven stepwise from the infinite focus position (position for bringing an object at infinity into focus) to the closest (shortest) focus position to obtain a contrast from a captured image signal at each different position of the focusing lens group, and a maximum value (peak value) of contrast among the contrasts obtained at the aforementioned different positions of the focusing lens group is determined so that the focusing lens group is driven to a position thereof where the maximum value of contrast is obtained to bring the object into focus. Such a focus detection apparatus is disclosed in, e.g., Japanese Unexamined Patent Publication No. 2001-249267.

In the conventional contrast detection method, the difference between two contrasts obtained at two different positions of the focusing lens group by moving the focusing lens group in the optical axis direction is small in the case of a low-contrast object image. Nevertheless, in the conventional contrast detection method, a reversal point where either the contrast (contrast value) of a captured image commences to decrease after increasing more than once (see FIG. 10A) or the contrast of a captured image commences to decrease more than once after increasing (see FIGS. 10B and 10C) is detected as a peak value (maximum value) of contrast, or only one of the number of successive increments or the number of successive decrements is counted to detect a peak value (maximum value) of contrast. Therefore, if the peak value (maximum value) of contrast is detected in each of a low-contrast object image and a normal (high-contrast) object image using a common criterion of judgment, a peak value of contrast cannot be detected in the low-contrast object image. Additionally, there is a possibility of the peak value of contrast in a low-contrast object image being determined as not being credible if the peak value (maximum value) of contrast is detected in each of a low-contrast object image and a normal object image using common criterion because the credibility of the detected peak value of contrast is determined from the magnitude of the contrast in the conventional contrast detection method.

SUMMARY OF THE INVENTION

The present invention provides a focus detection method which makes it possible to detect a peak contrast value (maximum contrast value) with a high probability even when object contrast is low in a focus detection apparatus for detecting a focus state in accordance with image contrast so that the credibility of the peak contrast value can be securely determined from the magnitude of the contrast. The present invention further provides a focus detection apparatus adopting such a focus detection method.

According to an aspect of the present invention, a focus detection apparatus for detecting a focus state of an object image in accordance with a contrast of the object image is provided, the focus detection apparatus including a lens system via which the object image is formed, the lens system including a focusing lens group movable along an optical axis thereof within a predetermined range of movement; and a controller for detecting a contrast value of the object image at each of different positions of the focusing lens group while moving the focusing lens group in a direction from one to the other of opposite ends of the range of movement. The controller establishes a first predetermined number and a first criterial value in the case where at least one of a maximum contrast value and a minimum contrast value among the contrast values respectively detected at the different positions of the focusing lens group by the controller is outside of a predetermined range, and establishes a second predetermined number, which is greater than the first predetermined number, and a second criterial value, which is less strict than the first criterial value, in the case where both the maximum contrast value and the minimum contrast value are within the predetermined range. The controller compares contrast values detected at two adjacent positions of the focusing lens group with each other successively at consecutive positions of the focusing lens group in the direction from the one end to the other end of the range of movement of the focusing lens group, wherein in the case where the controller establishes the first predetermined number and the first criterial value, the controller determines whether the contrast value of the object image increases once and subsequently decreases successively by the first predetermined number of times, and wherein in the case where the controller establishes the second predetermined number and the second criterial value, the controller determines whether the contrast value of the object image increases once and subsequently decreases successively by the second predetermined number of times; wherein the controller detects a maximum contrast value in the case where the controller determines that the contrast value of the object image increases once and subsequently decreases successively by one of the first predetermined number of times and the second predetermined number of times. The controller determines a difference between the maximum contrast value and a contrast value detected at a position of the focusing lens group which is away from a position thereof at which the maximum contrast value is obtained by a distance corresponding to one of the first predetermined number and the second predetermined number in one of opposite directions away from the maximum contrast value. The controller selects the maximum contrast value in the case where the difference exceeds one of the first criterial value and the second criterial value.

It is desirable for the controller to establish the first predetermined number and the first criterial value in the case where a ratio of the difference to the maximum contrast value exceeds a predetermined value; and for the controller to establish the second predetermined number and the second criterial value in the case where the ratio is one of equal to and smaller than the predetermined value.

It is desirable for the controller to determine the difference between the maximum contrast value and the contrast value detected at a position of the focusing lens group which is away from the position thereof at which the maximum contrast value is obtained by the distance corresponding to one of the first predetermined number and the second predetermined number in one of forward and rearward directions away from the maximum contrast value. In the case where the difference exceeds one of the first criterial value and the second criterial value, the controller determines that a focused focal point exits one of at, and in the vicinity of, the position of the focusing lens group at which the maximum contrast value is obtained.

It is desirable for the focus detection apparatus to further include a motor and a lens drive mechanism for moving the focusing lens group stepwise when the lens drive mechanism is driven by the motor.

It is desirable for the contrast of the object image to be measured by an image pickup device.

In an embodiment, a focus detection method for detecting a focus state of an object image in accordance with a contrast of the object image is provided, the focus detection method including detecting a contrast value of the object image at each of different positions of a focusing lens group while moving the focusing lens group in a direction from one to the other of opposite ends of a range of movement of the focusing lens group; establishing a first predetermined number and a first criterial value in the case where at least one of a maximum contrast value and a minimum contrast value among the contrast values respectively detected at the different positions of the focusing lens group is outside of a predetermined range, and establishing a second predetermined number which is greater than the first predetermined number and a second criterial value, which is less strict than the first criterial value, in the case where both the maximum contrast value and the minimum contrast value are within the predetermined range; comparing contrast values detected at two adjacent positions of the focusing lens group with each other successively at consecutive positions of the focusing lens group in the direction from the one end to the other end of the range of movement of the focusing lens group, wherein in the case where the first predetermined number and the first criterial value are established, it is determined whether the contrast value of the object image increases once and subsequently decreases successively by the first predetermined number of times, and wherein in the case where the second predetermined number and the second criterial value are established, it is determined whether the contrast value of the object image increases once and subsequently decreases successively by the second predetermined number of times; detecting a maximum contrast value in the case where it is determined that the contrast value of the object image increases once and subsequently decreases successively by one of the first predetermined number of times and the second predetermined number of times; determining a difference between the maximum contrast value and a contrast value detected at a position of the focusing lens group which is away from a position thereof at which the maximum contrast value is obtained by a distance corresponding to one of the first predetermined number and the second predetermined number in one of opposite directions away from the maximum contrast value; and selecting the maximum contrast value in the case where the difference exceeds one of the first criterial value and the second criterial value.

In an embodiment, a focus detection method for detecting a focus state of an object image in accordance with a contrast of the object image is provided, the focus detection method including, detecting a contrast value of the object image at each of different positions of a focusing lens group while moving the focusing lens group in a direction from one to the other of opposite ends of a range of movement of the focusing lens group; establishing a predetermined number and a criterial value in the case where at least one of a maximum contrast value and a minimum contrast value among the contrast values respectively detected at the different positions of the focusing lens group is outside of a predetermined range; comparing contrast values detected at two adjacent positions of the focusing lens group with each other successively at consecutive positions of the focusing lens group in the direction from the one end to the other end of the range of movement of the focusing lens group to determine whether the contrast value of the object image increases once and subsequently decreases successively a predetermined number of times; detecting a maximum contrast value in the case where it is determined that the contrast value of the object image increases once and subsequently decreases successively by the predetermined number of times; determining a difference between the maximum contrast value and a contrast value detected at a position of the focusing lens group which is away from a position thereof at which the maximum contrast value is obtained by a distance corresponding to one of the predetermined number in one of opposite directions away from the maximum contrast value; and selecting the maximum contrast value in the case where the difference exceeds the criterial value.

In an embodiment, a focus detection method for detecting a focus state of an object image in accordance with a contrast of the object image is provided, the focus detection method including, detecting a contrast value of the object image at each of different positions of a focusing lens group while moving the focusing lens group in a direction from one to the other of opposite ends of a range of movement of the focusing lens group; establishing a predetermined number and a criterial value in the case where both a maximum contrast value and a minimum contrast value among the contrast values respectively detected at the different positions of the focusing lens group are within a predetermined range; comparing contrast values detected at two adjacent positions of the focusing lens group with each other successively at consecutive positions of the focusing lens group in the direction from the one end to the other end of the range of movement of the focusing lens group to determine whether the contrast value of the object image increases once and subsequently decreases successively a predetermined number of times; detecting a maximum contrast value in the case where it is determined that the contrast value of the object image increases once and subsequently decreases successively by the predetermined number of times; determining a difference between the maximum contrast value and a contrast value detected at a position of the focusing lens group which is away from a position thereof at which the maximum contrast value is obtained by a distance corresponding to one of the predetermined number in one of opposite directions away from the maximum contrast value; and selecting the maximum contrast value in the case where the difference exceeds the criterial value.

According to the present invention, when a peak value of contrast is determined to detect a focused focal point, the determination of the credibility of the peak contrast value which is suitable for both a normal object image and a low-contrast object image becomes possible because the criterion for determining the credibility of the peak contrast value is high and strict in the case of a normal object image, and the criterion for determining the credibility of the peak contrast value is low and not strict in the case of a low-contrast object image.

Furthermore, according to the present invention, when a peak value of contrast is determined to detect a focused focal point, the credibility of the peak contrast value can be reliably determined for even a low-contrast object image because a criterial value for determining the credibility of the peak contrast value is set to a high value in the case of a normal object image and is set to low value in the case of a low-contrast object image.

The present disclosure relates to subject matter contained in Japanese Patent Application No. 2004-178727 (filed on Jun. 16, 2004) which is expressly incorporated herein by reference in its entirety.

BRIEF DESCRIPTION OF THE DRAWINGS

The present invention will be described below in detail with reference to the accompanying drawings in which:

FIG. 4 is a graph showing the relationship between the position of a focusing lens group and the contrast;

DESCRIPTION OF THE PREFERRED EMBODIMENT

Figure 1:
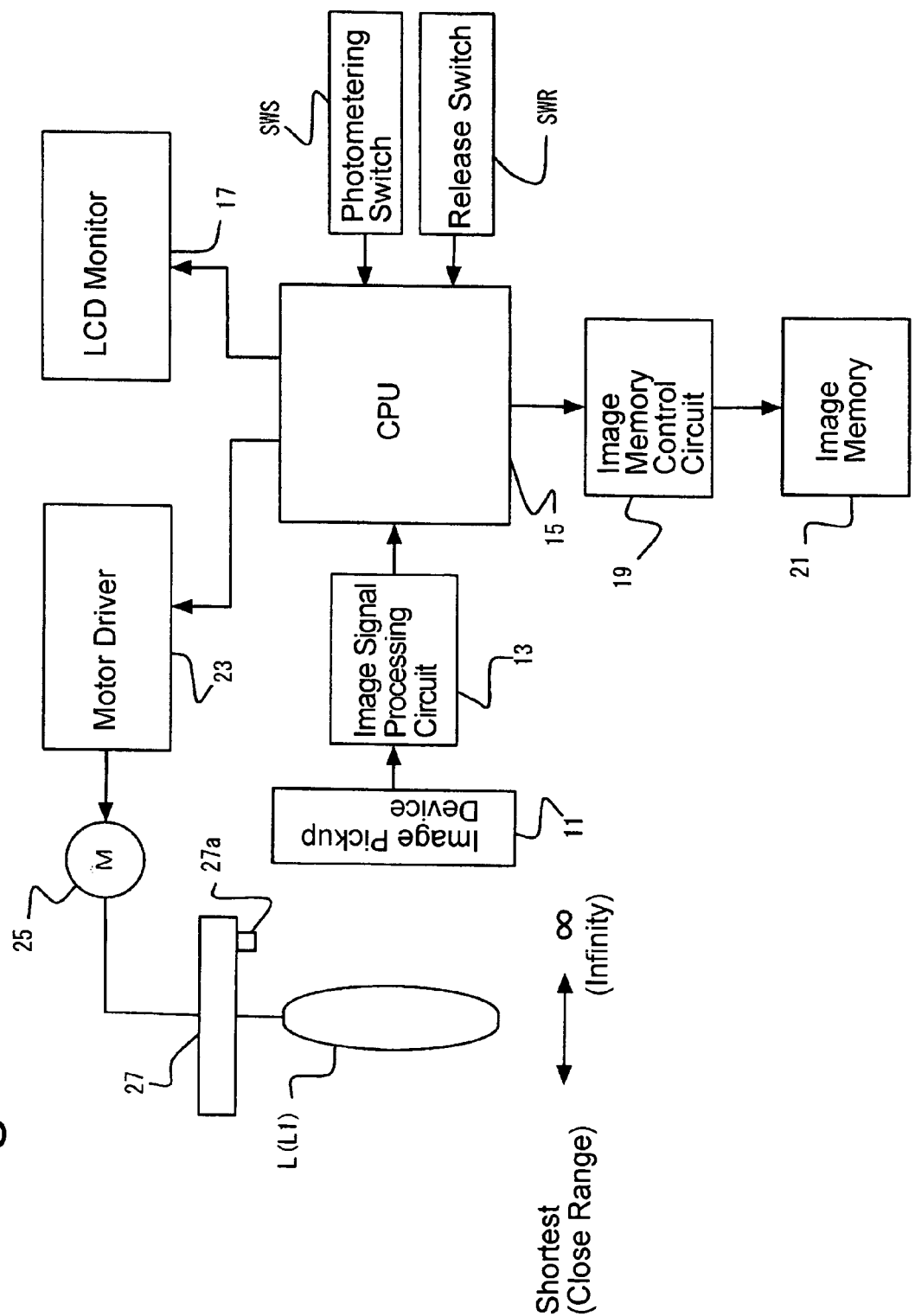
FIG. 1 is a block diagram of an embodiment of a digital camera to which the present invention is applied, showing a basic configuration of the digital camera.

FIG. 1 is a block diagram of an embodiment of a digital camera to which the present invention is applied.

The digital camera is provided with a photographing lens L including a focusing lens group L1, and an image pickup device (CCD image sensor) 11 serving as an imaging device. An object image is formed on a light receiving surface 12 (see FIG. 2) of the image pickup device 11 via the photographing lens L. The image pickup device 11 includes a large number of pixels (photoelectronic transducing elements) arranged in a two-dimensional matrix at predetermined intervals. The digital camera is further provided with an image signal processing circuit 13, a CPU (controller) 15, an LCD monitor 17, an image memory control circuit 19, an image memory 21, a motor driver 23, an AF motor 25 and a lens drive mechanism 27. Each pixel of the image pickup device 11 converts the incident light of an object image thereon into an electrical charge, and the electrical charges is accumulated (integrated). Upon completion of an exposure, the accumulated charges are output, pixel by pixel, as an image signal to the image signal processing circuit 13. The image signal processing circuit 13 performs predetermined adjusting processes such as a while balance adjusting process and an A/D converting process on the input image signal to output digital image data to the CPU 15. Namely, predetermined processes are performed on the input image signal in the image signal processing circuit 13, and the image data which is digitized into pixel data is output to the CPU 15. The CPU 15 converts the input image data into an image signal capable of being indicated on the LCD monitor 17 to visually indicate the image data on the LCD monitor 17 in a through mode (monitoring mode), and converts the input image data into image data having a predetermined format to write this image data into the image memory 21 via the image memory control circuit 19.

Figure 2:
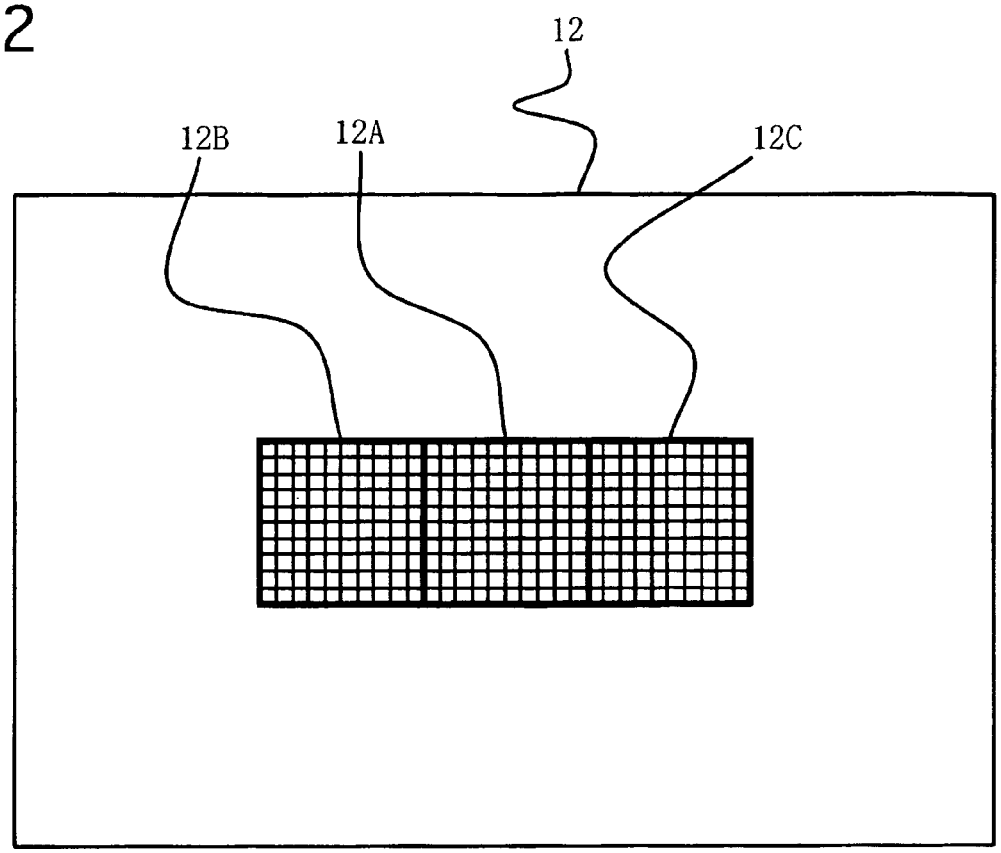
FIG. 2 is a diagrammatic illustration showing the relative position between a light receiving surface of an image pickup device and three focus detection areas on the light receiving surface in the digital camera shown in FIG. 1.
Figure 3:
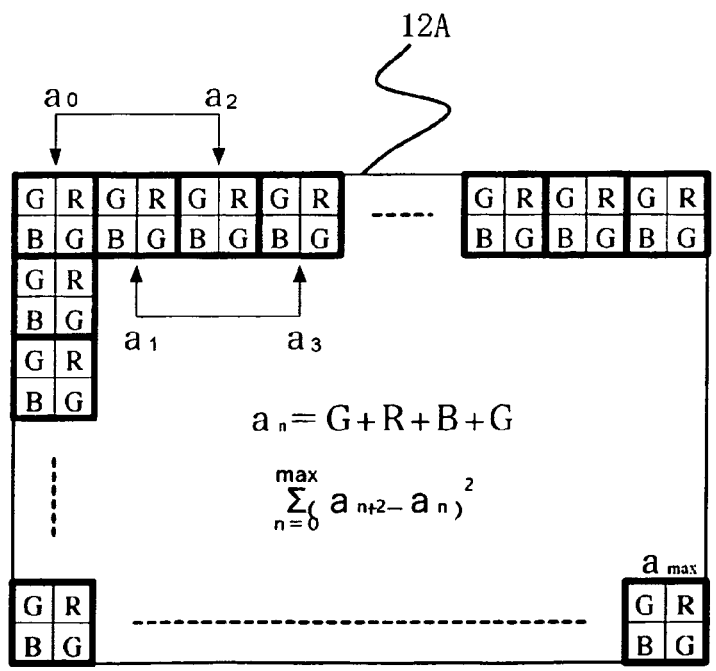
FIG. 3 is a diagrammatic illustration showing the relative position between the central focus detection area of the image pickup device and an array of pixels arranged thereon.

FIG. 2 shows the relative position between the light receiving surface 12 of the image pickup device 11 and three focus detection areas 12A, 12B and 12C on the light receiving surface 12 by way of example. FIG. 3 is an enlarged view of the central focus detection area 12A. Each of the remaining two focus detection areas 12B and 12C has the same structure as the central focus detection area 12A, and accordingly, only the central focus detection area 12A is shown in FIG. 3. The central focus detection area 12A is positioned at substantially the center of the light receiving area 12, while the remaining two focus detection areas 12B and 12C are positioned on laterally opposite sides of the central focus detection area 12A. Primary-color filters (red (R), green (G) and blue (B) filters) are disposed in front of each pixel (photoelectronic transducing element) on the object side thereof, and each pixel on the light receiving surface 12 transduces red, green and blue components of the incident rays of object light that are passed through the primary-color filters into electrical charges, and the electrical charges are accumulated. The electrical charges thus accumulated for a predetermined period of time are read out of the image pickup device 11 pixel by pixel to be output as an image signal.

FIG. 3 shows a conventional arrangement of primary-color filters. The primary-color filters include horizontal GR lines, in each of which green filters and red filters are horizontally arranged in alternative order, and horizontal BG lines, in each of which blue filters and green filters are horizontally arranged in alternative order, so that the GR lines and the BG lines are vertically arranged in alternative order. In the illustrated embodiment of the digital camera, four pixels (a 2 by 2 matrix of pixels) in each square, namely, a combination of two green filters, a red filter and a blue filter is treated as one pixel block, and the sum of the magnitudes of image signals integrated by the four pixels in each pixel block is regarded as intensity $a_n$ ($a_n$=G+R+B+G).

On the top of that, an operation for determining the difference between the intensity $a_n$ of a pixel block and the intensity $a_n$ of another pixel block positioned one pixel-block away from the previous pixel block in the horizontal direction is repeated successively in the horizontally rightward direction within the focus detection area 12A while the differences thus determined ($a_{n+2}-a_n$) are added up. Upon completion of such difference determining and adding operations on the pixel block at the right end of the focus detection area 12A in the horizontal direction, the difference determining and adding operations are repeated on the next row of pixel blocks directly below the previous row of pixel blocks by one pixel block in the vertical direction until completion of the determining operation on the pixel block at the right end of the focus detection area 12A in the horizontal direction and completion of the adding operation. Such difference determining and adding operations are repeated on all the pixel blocks in the focus detection area 12A. Subsequently, the same operations are performed on each of the remaining two focus detection areas 12B and 12C.

The sum of the differences ($a_{n+2}-a_n$) on each of the three focus detection areas 12A, 12B and 12C corresponds to the contrast value on that focus detection area at the current position of the focusing lens group L1. The contrast value can be represented by the following expression:

$$\sum_{n=0}^{max} (a_{n+2} - a_n)^2 \qquad \text{[Expression 1]}$$

Figure 6:
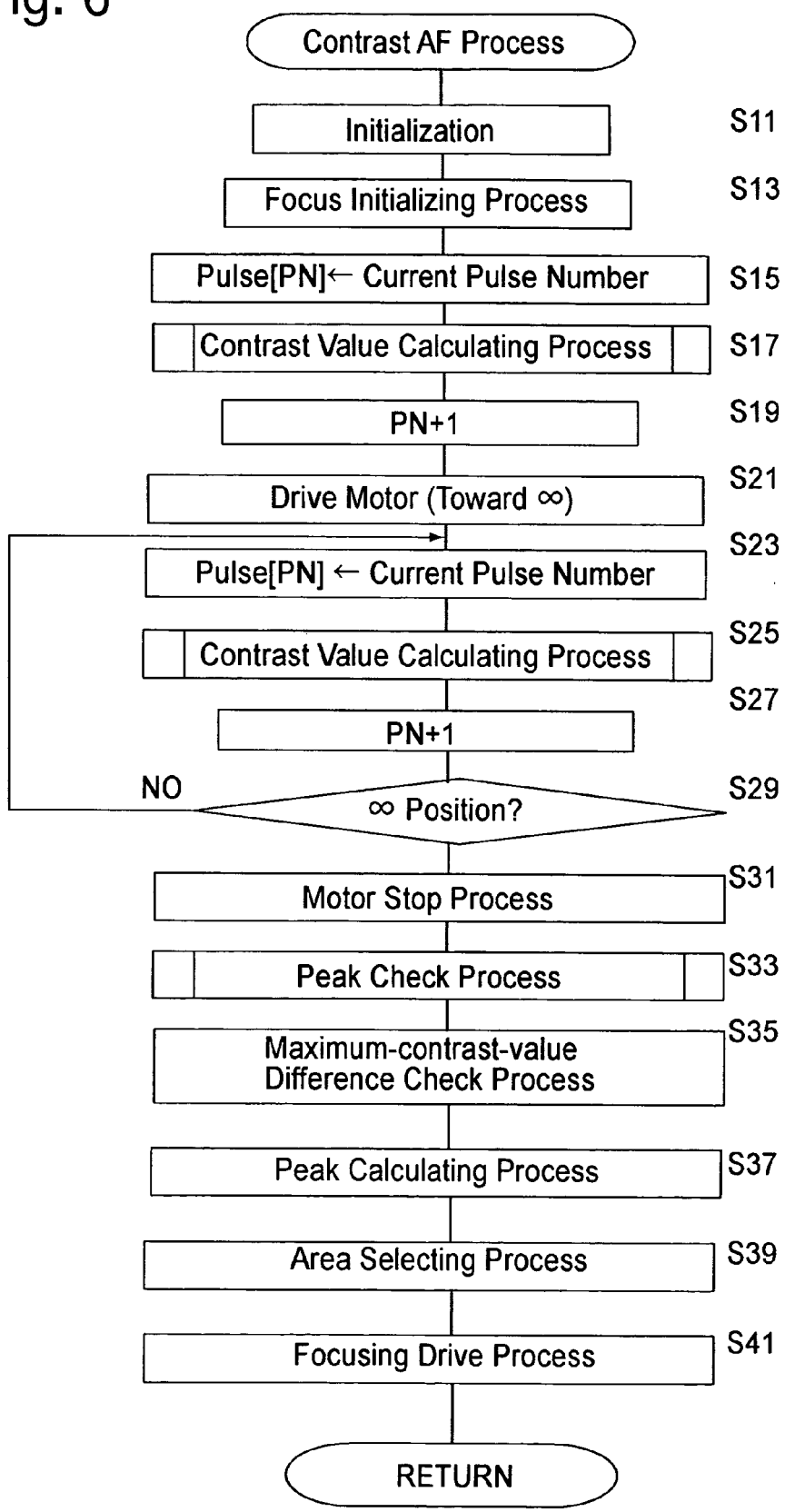
FIG. 6 is a flow chart showing a contrast AF process performed in the digital camera shown in FIG. 1.

In a contrast AF process (see FIG. 6) of the present embodiment of the digital camera, the CPU 15 performs an imaging operation with the image pickup device 11 while moving the focusing lens group L1 stepwise via the motor driver 23, the AF motor 25 and the lens drive mechanism 27, inputs the image signals from the three focus detection areas 12A, 12B and 12C to determine the contrast values on the three focus detection areas 12A, 12B and 12C, respectively, and stores the determined contrast values in an internal RAM of the CPU 15 as contrast data The CPU 15 repeats the contrast AF process while moving the focusing lens group L1 stepwise in the direction from one end to the other end of the moving range of the focusing lens group L1, i.e., from the closest (shortest) focus position to the infinite focus position (position for bringing an object at infinity into focus). FIG. 4 shows the relationship between the position of the focusing lens group L1 and the contrast value.

In the present embodiment of the digital camera, the position of the focusing lens group L1 is detected by an origin sensor 27a with the closest (shortest) focus position of the focusing lens group L1 being taken as a point of origin, and is counted as the number of driving pulses from the point of origin. The driving pulses are defined as, e.g., pulses output from an encoder such as a photo-interrupter installed on the output shaft of the AF motor 25. Although several hundreds of pulses or more are usually necessary for driving the focusing lens group L1 from the closest (shortest) focus position to the infinite focus position, several pulses or several tens of pulses are only necessary for driving the focusing lens group L1 from the closest (shortest) focus position to the infinite focus position in the contrast AF process in the present embodiment of the digital camera since the focusing lens group L1 is moved stepwise. In addition, in the driving pulses used in the contrast AF process in the present embodiment of the digital camera, one driving pulse constitutes more than one pulse output from the aforementioned photo-interrupter.

The contrast AF process performed in the present embodiment of the digital camera will be discussed in detail with reference to the flow charts shown in FIGS. 6, 7, 8 and 9. In this particular embodiment, the contrast AF process shown in FIG. 6 commences immediately after the photometering switch SWS is turned ON, and is completed immediately after an in-focus state is obtained.

In the contrast AF process, firstly various variables and the like are initialized (step S11). For instance, each status is cleared, contrast values are cleared, a pulse number PN is initialized (PN=0), the maximum contrast value is set to zero, the minimum contrast value is set to FFFFFFFF, and the number of focus detection areas is selected according to the focal length of the photographing lens L in the present embodiment of the digital camera. The pulse number. PN is a variable which is increased by 1 every time the focusing lens group L1 moves toward the infinite focus position by one pulse, wherein the pulse number PN is zero when the focusing lens group L1 is in the closest (shortest) focus position. Note that the aforementioned number of focus detection areas is selected from among predetermined different numbers according to the focal length of the photographing lens L to calculate the contrast value.

Upon completion of the initializing process at step S11, a focus initializing process is performed (step S13). In this process, the focusing lens group L1 is moved to one of the opposite ends of the moving range of the focusing lens group L1, specifically to the closest (shortest) focus position in this particular embodiment. Whether the focusing lens group L1 reaches the closest (shortest) focus position or not is detected with the origin sensor 27a.

Thereafter, a variable Pulse[PN] is set to the current pulse number PN (which is 0 (zero) at this stage, corresponding to the closest (shortest) focus position) (step S15), and subsequently a contrast value calculating process is performed (step S17). In the contrast value calculating process, a contrast value P[0] when the focusing lens group L1 is positioned at the closest (shortest) focus position is calculated in accordance with the image data input from the image pickup device 11, and each of the maximum contrast value and the minimum contrast value is replaced by new one.

Subsequently, the pulse number PN is increased by one (step S19), and the lens drive mechanism 27 is driven stepwise in a direction toward the infinite focus position (step S21). Namely, the focusing lens group L1 is made to start moving stepwise in a direction from the closest (shortest) focus position to the infinite focus position.

Subsequently, the variable Pulse[PN] is set to the current pulse number PN (step S23), and subsequently the contrast value calculating process is performed, in which the contrast value P[PN] is calculated in accordance with the image data input from the image pickup device 11 while each of the maximum contrast value and the minimum contrast value is replaced by new one (step S25). Thereafter, the pulse number PN is increased by one (step S27). Upon completion of the operation at step S27, it is determined whether the focusing lens group L1 has reached the infinite focus position (step S29). If it determined that the focusing lens group. L has not yet reached the infinite focus position (if NO at step S29), control returns to step S23 so that the operations at steps S23 through S27 are repeated while the focusing lens group L1 is driven stepwise, in increments of one pulse, toward the infinite focus position.

Immediately after the focusing lens group L1 reaches the infinite focus position (if YES at step S29), the lens drive mechanism 27 is stopped (step S31). Subsequently, a peak check process (see FIG. 11) is performed in accordance with the contrast data obtained in the aforementioned loop process, i.e., the operations at steps S23 through S27 (step S33). Upon completion of the peak check process, a maximum-contrast-value difference check process is performed in which it is determined whether the difference between the first-highest maximum contrast value and the second-highest maximum contrast value is smaller than a predetermined value (step S35). Although this process at step S35 is performed on each of the three focus detection areas 12A, 12B and 12C, it is determined that no maximum contrast value exits if the difference between the first-highest maximum contrast value and the second-highest maximum contrast value is smaller than the predetermined value because it is difficult to determine which of the two maximum contrast values is a real maximum contrast value.

Thereafter, a peak (maximum value) calculating process in which a precise peak of contrast (maximum contrast value) is determined from an approximate (interpolation) calculation in accordance with contrast values P[PN] at a plurality of points between the selected two maximum contrast values is performed (step S37). The aforementioned steps 33 through S37 are performed on each of the three focus detection areas 12A, 12B and 12C.

Subsequently, an area selecting process is performed (step S39). In this process, one of the three focus detection areas 12A, 12B and 12C in which the closest focus position of the focusing lens group L1 among the focus lens positions thereof respectively obtained from the focus detection area's 12A, 12B and 12C is selected as an in-focus area. Thereupon, the focusing lens group L1 is moved to the focus position of the selected focus detection area 12A, 12B or 12C to bring an object into focus (step S41), which ends the contrast AF process, and control returns to the step where the contrast AF process was called.

[Contrast Value Calculating Process]

Figure 7:
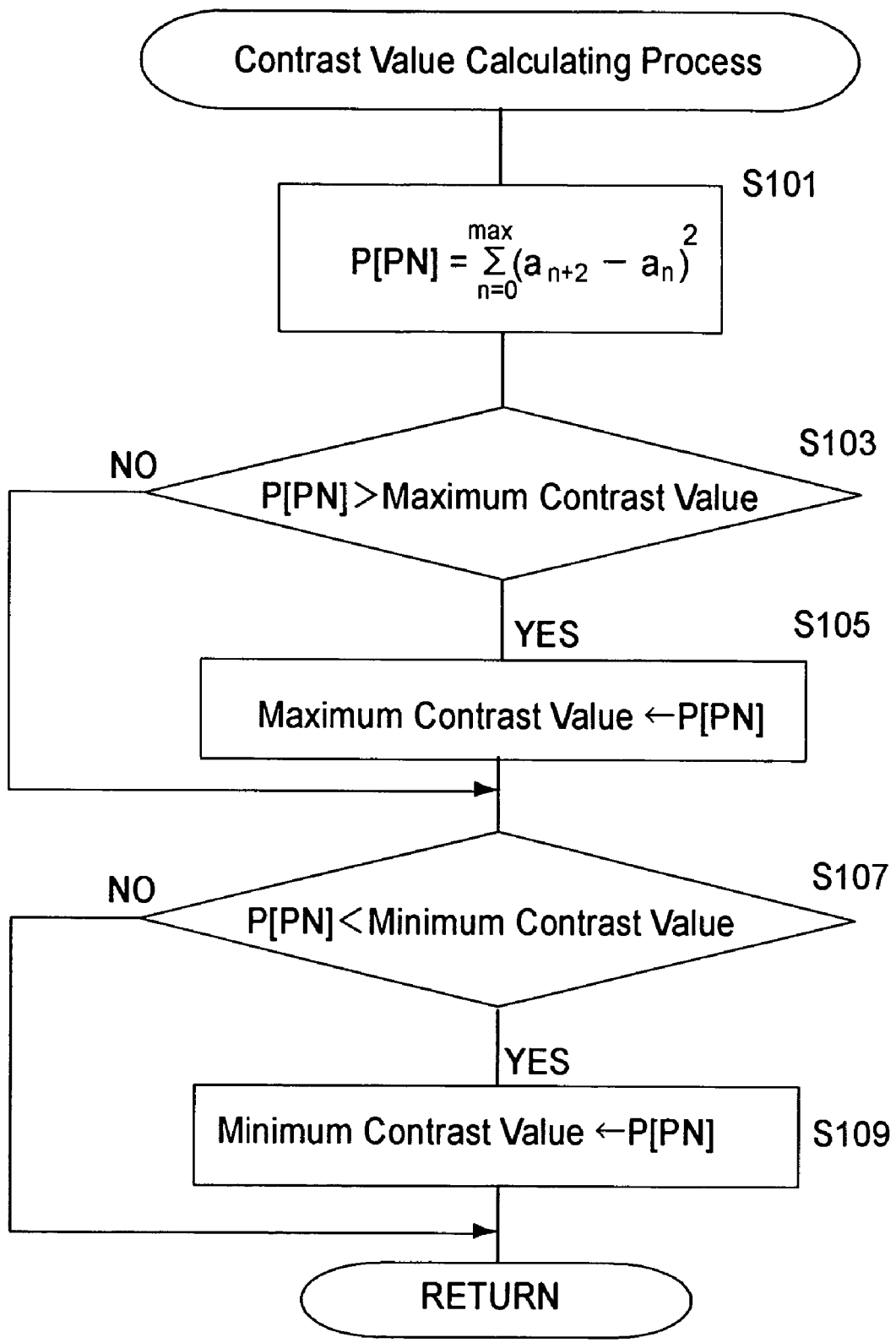
FIG. 7 is a flow chart showing a sub-routine "Contrast Value Calculating Process" performed in the contrast AF process shown in FIG. 6.
Figure 10A:
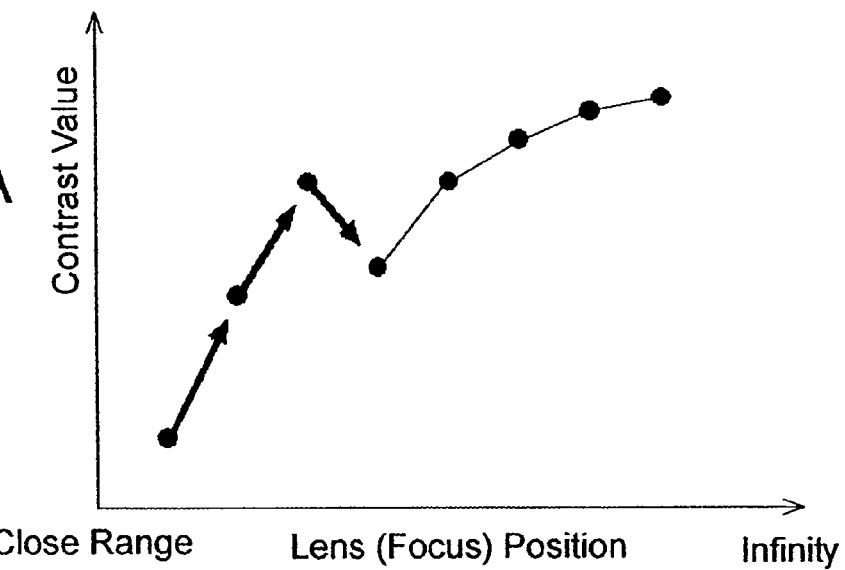
FIGS. 10A, 10B and 10C are graphs showing examples of a peak contrast detected by the peak check process according to a conventional-contrast detection method in a conventional digital camera.
Figure 10B:
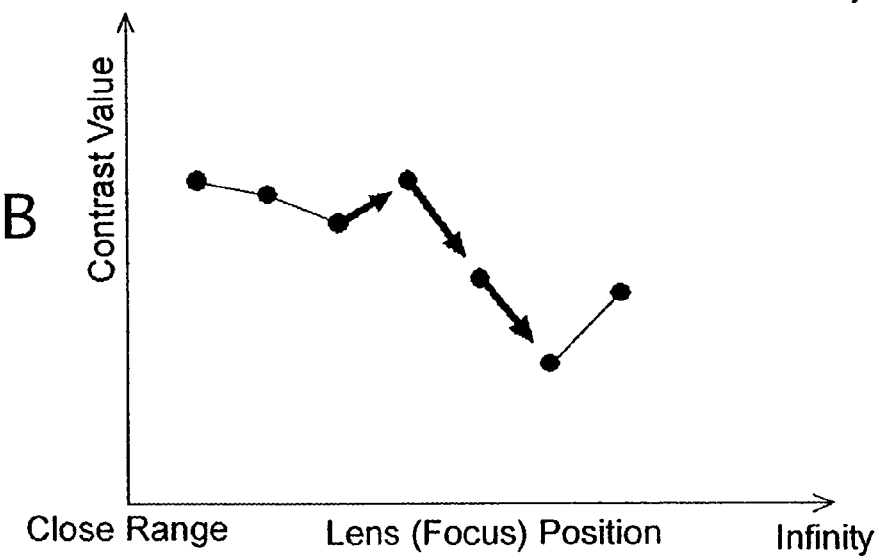
Figure 10C:
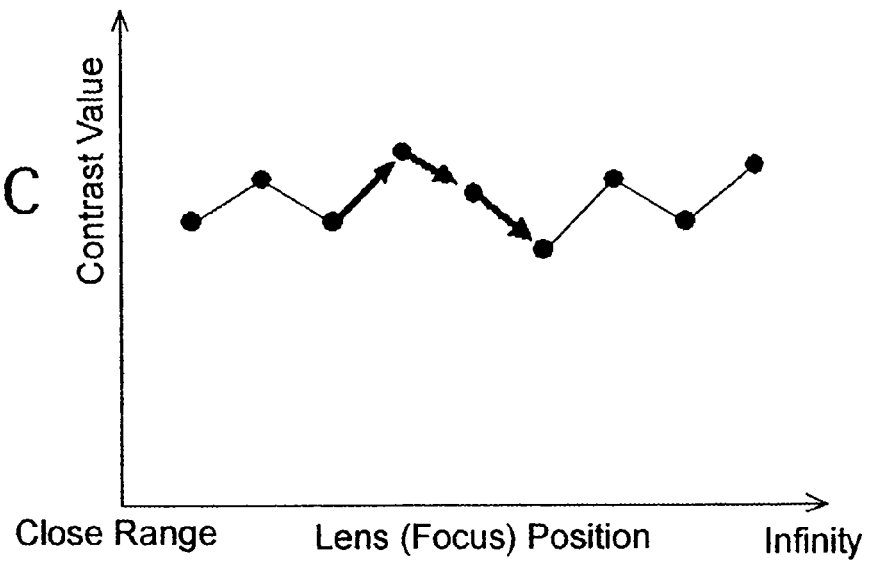

The contrast value calculating process that is performed at steps S17 and S25 will be hereinafter discussed with reference to the flow chart shown in FIG. 7. Although the contrast value calculating process is performed on each of the three focus detection areas 12A, 12B and 12C, the contrast value calculating process that is represented by the flow chart shown in FIG. 10 will be discussed as a process performed only on one of the three focus detection areas 12A, 12B and 12C, specifically the center focus detection area 12A because the contrast value calculating process is repeated to be performed on each of the three focus detection areas 12A, 12B and 12C.

In the contrast value calculating process, firstly the contrast value P[PN] is determined from the following expression (step S101):

$$P[PN] = \sum_{n=0}^{max} (a_{n+2} - a_n)^2 \quad \text{[Expression 2]}$$

Subsequently, the maximum contrast value P[PN] is determined from among the determined contrast values P[PN] (steps S103 and S105), and the minimum contrast value P[PN] is determined from among the determined contrast values P[PN] (step S107 and S109). If both the maximum contrast value P[PN] and the minimum contrast value P[PN] are determined (if YES at each of steps S103 and S107), control returns to the contrast AF process. FIG. 6A shows the case where the difference between the maximum contrast value P[PN] and the minimum contrast value P[PN] is great, while FIG. 6B shows the case where the difference between the maximum contrast value P[PN] and the minimum contrast value P[PN] is small.

[Peak (Maximum Value) Check Process]

Figure 5A:
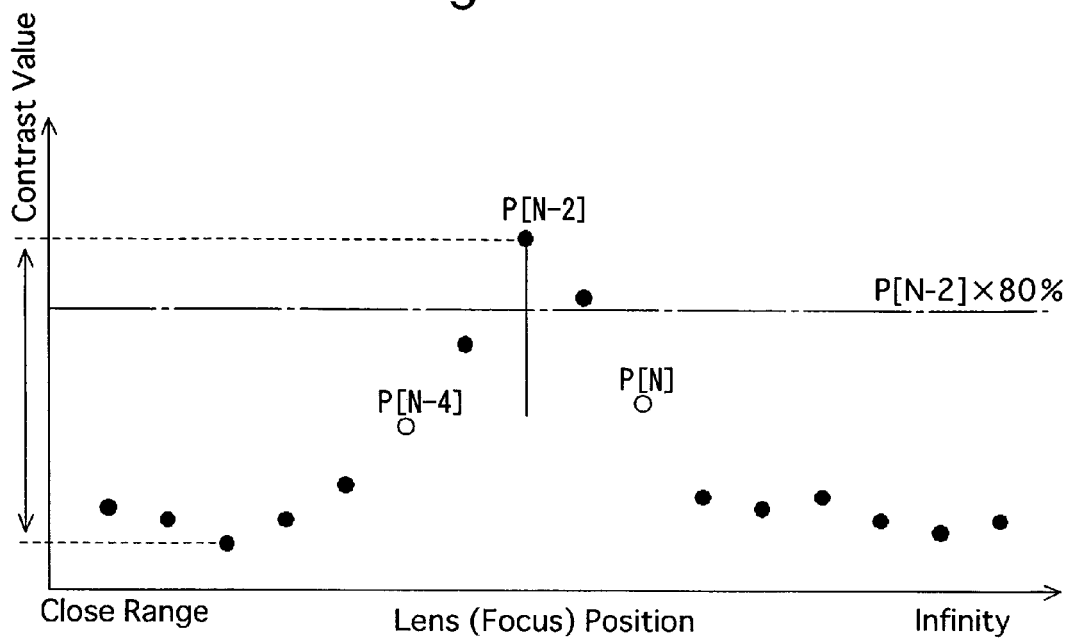
FIG. 5A is a graph illustrating the relationship between the position of the focusing lens group (focal point) and contrast value in a peak check process performed by the digital camera shown in FIG. 1 in the case of a normal-contrast object.
Figure 5B:
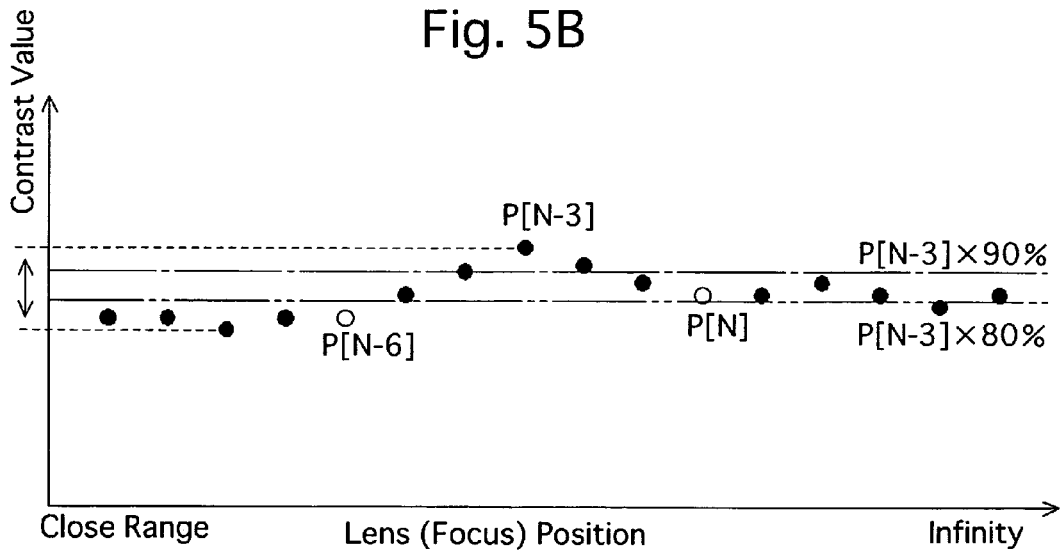
FIG. 5B is a graph similar to that of FIG. 5A, showing the relationship between the position of the focusing lens group (focal point) and contrast value in the peak check process in the case of a low-contrast object image.
Figure 8:
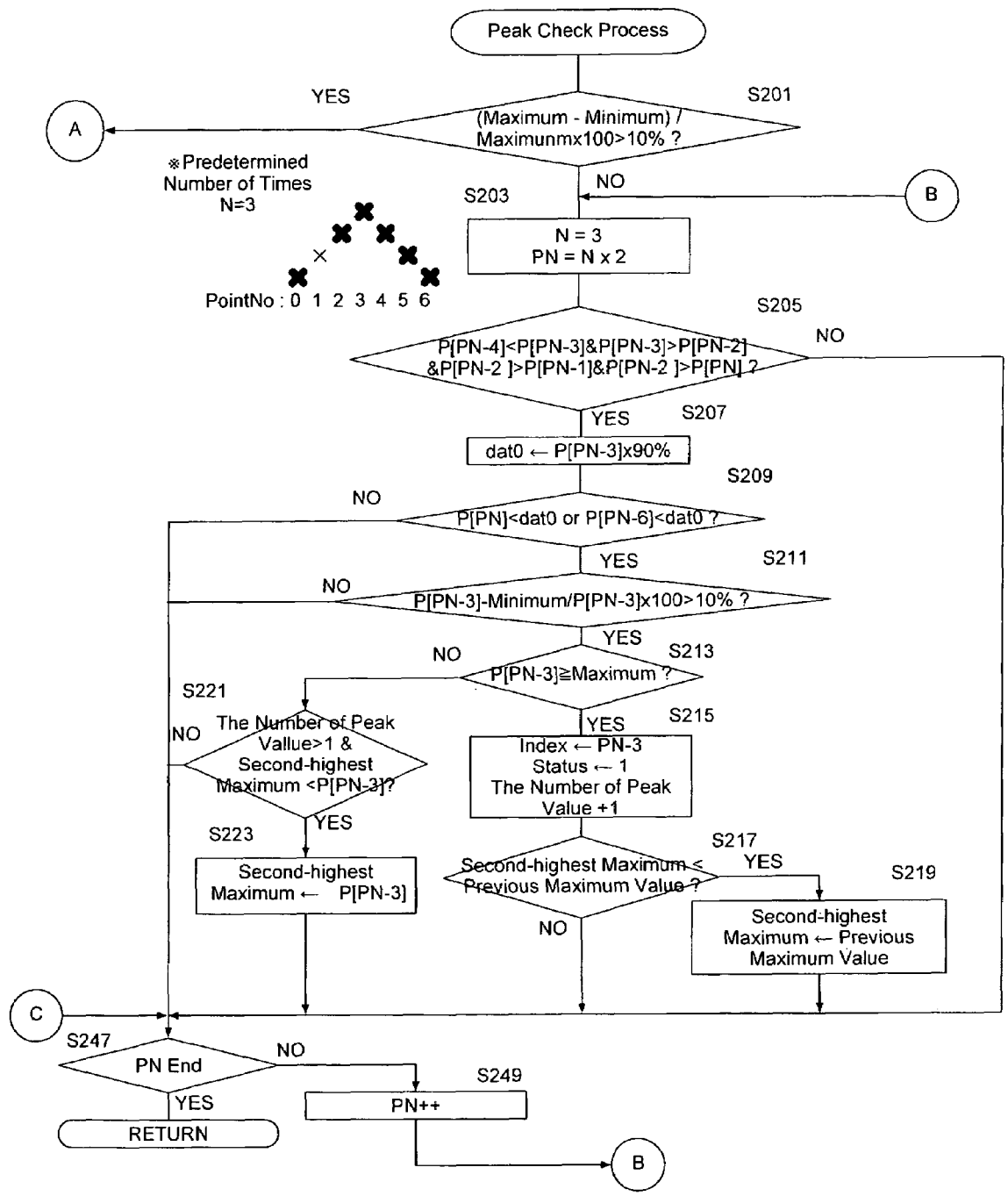
FIG. 8 is a flow chart showing a half of a sub-routine "Peak Check Process" performed in the contrast AF process shown in FIG. 6.

The peak (maximum value) check process performed at step S33 will be hereinafter discussed in detail with reference to the flow chart shown in FIGS. 8 and 9. In the peak check process, a peak value (maximum value) of contrast is determined from the contrast values P[PN]which are obtained at stepwise positions of the focusing lens group L1, respectively, by moving the focusing lens group L1 stepwise. Although the contrast values P[PN] obtained at two adjacent positions of the focusing lens group L1 are compared with each other on a specified number of contrast values P[PN] obtained at consecutive positions of the focusing lens group L1 from the closest (shortest) focus position to the infinite focus position, such a contrast value comparing process is performed in two different manners depending on whether the object image is a normal object image (i.e., not a low-contrast object image) or a low-contrast object image. FIGS. 5A and 5B are graphs illustrating the relationship between the position of the focusing lens group L1 (focal point) and the contrast value in the peak check process in the case of a normal object image and a low-contrast object image, respectively.

Firstly, in the case of a normal object image, a peak value (maximum value) of the contrast is detected by determining whether the contrast value firstly increases a first predetermined number of times and subsequently decreases the same first predetermined number of times. In this embodiment, the first predetermined number is set to "2" for example. In the case of a low-contrast object image, a peak value (maximum value) of contrast is detected by determining whether the contrast value firstly increases a second predetermined number of times which is greater than the aforementioned first predetermined number of times and subsequently decreases the second predetermined number of times. In this embodiment, the second predetermined number is set to "3" for example.

Thereafter, in the case of a normal object image, the credibility of the detected peak value (maximum value) of contrast is determined by determining whether the contrast value P[PN-4] or P[PN] (that is obtained at that position of the focusing lens group L1 which is rearwardly or forwardly two steps (a distance of two pulses) away from the position of the focusing lens group L1 at which the contrast value P[PN-2] (which is to be the maximum contrast value in the case of a normal object image) is obtained, respectively) is smaller than 80 percent of a first criterial value, i.e., the contrast value P[PN-2].

On the other hand, in the case of a low-contrast object image, the credibility of the detected peak value (maximum value) of contrast is determined by determining whether the contrast value P[PN-6] or P[PN] (that is obtained at that position of the focusing lens group L1 which is rearwardly or forwardly three steps (a distance of three pulses) away from the position of the focusing lens group L1 at which the contrast value P[PN-3] (which is to be the maximum contrast value in the case of a low-contrast object image) is obtained, respectively) is smaller than 90 percent of a second criterial value, i.e., the contrast value P[PN-3] that is less strict than the first criterial value.

In the peak check process, firstly it is determined whether the difference between the maximum contrast value and the minimum contrast value exceeds 10 percent of the maximum contrast value, i.e., whether an object image is a normal object image (not a low-contrast object image) (step S201).

[Low-Contrast Object Image]

If the object image is a low-contrast object image (if NO at step S201), the number of check times N is set to 3, i.e., the number of contrast values to be used in the peak check process is set to 5 (step S203). Subsequently, contrast data at two adjacent positions of the focusing lens group L1 are compared with each other successively at a consecutive plurality of lens positions from the close range side to the long range side to determine whether the contrast value increases once and subsequently decreases three times in a row (step S205). Specifically, in the present embodiment of the digital camera, it is determined whether the contrast value increases once and subsequently decreases three times in a row on a group of five contrast data (obtained contrast values) at successive five lens positions from the close range side, i.e., on the five contrast values from the contrast value. P[PN-4] to the contrast value P[PN]. If it is determined that the contrast value does not vary in such a manner (if NO at step S205), it is determined whether the pulse number PN is the end pulse number (which corresponds to the infinite focus position) (step S247). If it is determined that the pulse number PN is not the end pulse number (if NO at step S247), the pulse number PN is increased by one (step S249), and control returns to step S203. If it is determined that the pulse number PN is the end pulse number (if YES at step S247), control returns to the contrast AF process.

[The Determination of the Credibility of the Maximum Contrast Value]

If it is determined that the contrast value increases once from the contrast value P[PN-_4] and subsequently decreases three times in a row (if YES at step S205), a value corresponding to 90 percent of the contrast value P[PN-3] that is to be the maximum contrast value is determined and this determined value is set to a lower limit value dat0 (step S207). Subsequently, it is determined whether either the contrast value P[PN-6] or the contrast value P[PN], that is obtained at the position of the focusing lens group L1 which is rearwardly or forwardly three steps (a distance of three pulses) away (±N (=3)) from the position of the focusing lens group L1 at which the contrast value P[PN-3] (which is to be the maximum contrast value in the case of a normal object image) is obtained, respectively, is smaller than the lower limit value dat0 (step S209). This determining operation at step S209 makes it possible to determine the credibility of the maximum contrast value (the contrast value P[PN-3]) that exits between the contrast value P[PN-6] and the contrast value P[PN] in the case of a low-contrast object image.

[The Determination of Credibility of Maximum Contrast Value]

If it is determined that either the contrast value P[PN-6] or the contrast value P[PN] is smaller than the lower limit value dat0 (if YES at step S209), it is determined whether the difference between the maximum contrast value P[PN-3] and the minimum contrast value among the all remaining contrast values exceeds 10 percent of the maximum contrast value (step S211). If the difference between the maximum contrast value P[PN-3] and the minimum contrast value among the all remaining contrast values exceeds 10 percent of the maximum contrast value (if YES at step S211), it is determined whether the contrast value P[PN-3] is equal to or greater than the maximum contrast value of all the detected contrast values (step S213). The operation at step S211 makes it possible to determine the credibility of the contrast value P[PN-3], namely, whether the contrast value P[PN-3] which is to be the maximum contrast value is the real maximum contrast value among all the detected contrast values, i.e., whether the contrast value P[PN-3] corresponds to a focused focal point.

If it is determined that the contrast value P[PN-3] is equal to or greater than the maximum contrast value of all the detected contrast values (if YES at step S213), a peak point "Index" indicating a peak point (focus point) is set to the pulse number PN-3 in which the maximum contrast value P[PN-3] is obtained, a peak existence flag "Status" is set to 1 indicating that there is a peak value (maximum value) of contrast, and the number of peak values (maximum values) is increased by one (step S215). Accordingly, the contrast value P[PN-3] is selected as a peak value (maximum value) of contrast.

Thereafter, it is determined whether the second-highest maximum contrast value is smaller than the previously detected maximum value (step S217), and control proceeds to step S219 if the second-highest maximum contrast value is smaller than the previously detected maximum value (if YES at step S217). The second-highest maximum contrast value is set to the previously detected maximum value at step S219, and control proceeds to step S247. If the second-highest maximum contrast value is not smaller than the previously detected maximum value (if NO at step S217), control simply proceeds to step S247 from step S217.

If it is determined that the contrast value P[PN-3] is not equal to or greater than the maximum contrast value of all the detected contrast values (if NO at step S213), it is determined whether the number of peak values is greater than 1 and the second-highest maximum contrast value is smaller than the contrast value P[PN-3] (step S221). If the number of peak values is greater than 1 and the second-highest maximum contrast value is smaller than the contrast value P[PN-3] (if YES at step S221), the second-highest maximum contrast value is set to the contrast value P[PN-3], and control proceeds to step S247. If the number of peak values is either not greater than 1 or the second-highest maximum contrast value is not smaller than the contrast value P[PN-3] (if NO at step S221), control simply proceeds to step S247 from step S221.

Even if a peak value (maximum value) of contrast is detected (even if YES at step S205), control proceeds to step S247 if each of the contrast value P[PN-6] and the contrast value P[PN] is equal to or greater than the lower limit value dat0 (if NO at step S209) or if the difference between the maximum contrast value P[PN-3] and the minimum contrast value among the all remaining contrast values does not exceed 10 percent of the maximum contrast value (if NO at step S211). This is because the credibility of the operation for detecting the peak value of contrast is low or the credibility of the peak value of contrast is low.

[Normal-Contrast Object Image]

Figure 9:
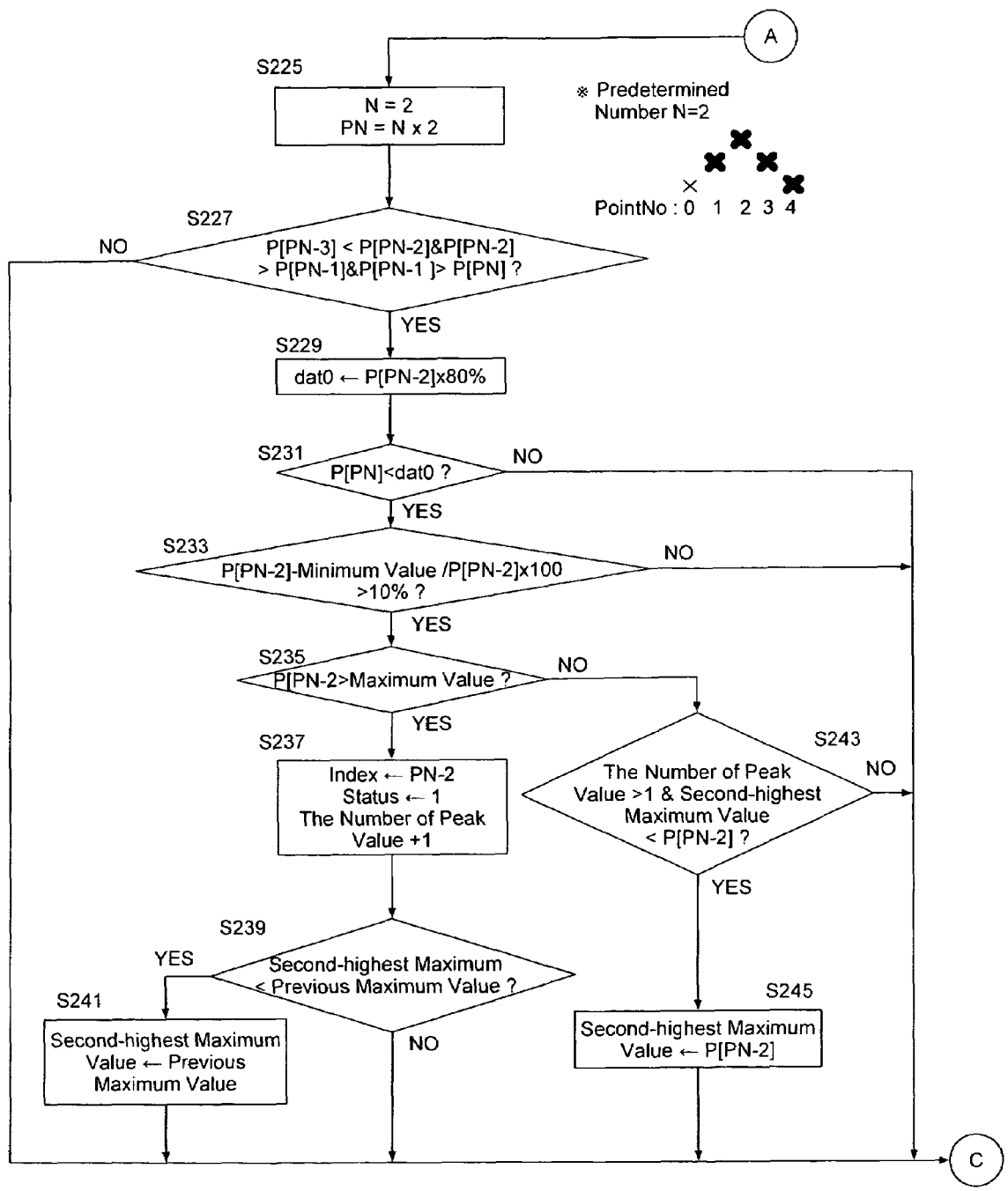
FIG. 9 is a flow chart showing the other half of the sub-routine "Peak Check Process"

If the object image is not a low-contrast object (if YES at step S201), the number of check times N is set to 2, and the pulse number PN is set to N×2, i.e., the number of contrast values to be compared is set to 4 (step S225 of FIG. 9). Subsequently, it is determined whether the contrast value increases once and subsequently decreases two times in a row on a group of four contrast data (obtained contrast values) at successive four lens positions from the close range side, i.e., on the four contrast values from the contrast value P[PN-3] to the contrast value P[PN] (step S227). If it is determined that the contrast value does not vary in such a manner (if NO at step S227), control proceeds to step S247.

[The Determination of the Credibility of the Maximum Contrast Value]

If it is determined that the contrast value increases once and subsequently decreases two times in a row (if YES at step S227), a value corresponding to 80 percent of the contrast value P[PN-2] that is to be the maximum contrast value is determined, and this determined value is set to the lower limit value dat0 (step S229). Subsequently, it is determined whether the contrast value P[PN], that is obtained at the long distance end of the range of movement of the focusing lens group L1, is smaller than the lower limit value dat0 (step S231). This determining operation at step S231 makes it possible to determine the credibility of the maximum contrast value (the contrast value P [PN-2]) that exits between the contrast value P[PN-3] and the contrast value P[PN] in the case of a normal object image. The difference between the determining operation (in the case of a normal object image) at step S231 and the determining operation in the case of a low-contrast object image) at step S209 is that the lower limit value dat0 used in the determining operation at step S231 is smaller than that in the determining operation at step S209, i.e., a stricter 80 percent of the maximum contrast value P[PN-2], and that the contrast value which is to be compared with the lower limit value dat0 is the contrast value P[PN] (positioned on the long distance side by two steps away from the contrast value P[PN-2]) that is smaller than that in the case of a low-contrast object image.

[The Determination of the Credibility of the Maximum Contrast Value]

If it is determined that the contrast value P[PN] is smaller than the lower limit value dat0 (if YES at step S231), it is determined whether the difference between the maximum contrast value P[PN-2] and the minimum contrast value among the all remaining contrast values exceeds 10 percent of the contrast value P[PN-2] (step S233). If the difference between the maximum contrast value P[PN-2] and the minimum contrast value among the all remaining contrast values exceeds 10 percent of the contrast value P[PN-2] (if YES at step S233), it is determined whether the contrast value P[PN-2] is equal to or greater than the maximum contrast value of all the detected contrast values (step S235). The operation at step S235 makes it possible to determine the credibility of the contrast value P[PN-2], namely, whether the contrast value P[PN-2] which is to be the maximum contrast value is the real maximum contrast value among all the detected contrast values, i.e., whether the contrast value P[PN-2] corresponds to a focused focal point.

If it is determined that the contrast value P[PN-2] is equal to or greater than the maximum contrast value of all the detected contrast values (if YES at step S235), the peak point "Index" is set to the pulse number PN-2 in which the maximum contrast value P[PN-2] is obtained, the peak existence flag "Status" is set to 1, and the number of peak values (maximum values) is increased by one (step S237). Accordingly, the contrast value P[PN-2] is selected as a peak value (maximum value) of contrast.

Thereafter, it is determined whether the second-highest maximum contrast value is smaller than the previously detected maximum value (step S239), and control proceeds to step S241 if the second-highest maximum contrast value is smaller than the previously detected maximum value (if YES at step S239). The second-highest maximum contrast value is set to the previously detected maximum value at step S241 and control proceeds to step S247. If the second-highest maximum contrast value is not smaller than the previously detected maximum value (if NO at step S239), control simply proceeds to step S247 from step S239.

If it is determined that the contrast value P[PN-2] is not equal to or greater than the maximum contrast value of all the detected contrast values (if NO at step S235), it is determined whether the number of peak values is greater than 1 and the second-highest maximum contrast value is smaller than the contrast value P[PN-2] (step S243). If the number of peak values is greater than 1 and the second-highest maximum contrast value is smaller than the contrast value P[PN-2] (if YES at step S243), the second-highest maximum contrast value is set to the contrast value P[PN-2] and control proceeds to step S247. If the number of peak values is either not greater than 1 or the second-highest maximum contrast value is not smaller than the contrast value P[PN-2] (if NO at step S243), control simply proceeds to step S247 from step S243.

If the contrast value P[PN] is not smaller than the lower limit value dat0 (if NO at step S231), control proceeds to step S247. Even if the contrast value P[PN] is smaller than the lower limit value dat0 (if YES at step S231), control proceeds to step S247 if the difference between the maximum contrast value P[PN-2] and the minimum contrast value among the all remaining contrast values does not exceed 10 percent of the contrast value P[PN-2] (if NO at step S233). Upon proceeding to step S247, if it is determined at step S247 that the pulse number PN is not yet the end pulse number, the pulse number PN is increased by one (step S249) and control returns to step S203, or control returns to the contrast AF process if it is determined at step S247 that the pulse number PN is the end pulse number.

As can be understood from the above description, in the above illustrated embodiment of the focus detection apparatus, a maximum value (peak value) of contrast among the contrast values obtained at different positions of the focusing lens group can be determined with precision even in the case of a low-contrast object image because the maximum contrast value is detected by determining whether the contrast value firstly increases once and subsequently decreases two times in a row in the case where the contrast of an object to be photographed is high, whereas the maximum contrast value is detected by determining whether the contrast value firstly increases once and subsequently decreases three times in a row in the case where the contrast of an object to be photographed is low. Moreover, in the above illustrated embodiment of the focus detection apparatus, a maximum value (peak value) of contrast among the contrast values obtained at different positions of the focusing lens group can be securely determined even in the case of a low-contrast object image because the credibility of the detected peak value (maximum value) of contrast is determined under strict conditions with a contrast value (P[PN-4] or P[PN]) that is obtained at the position of the focusing lens group L1 which is rearwardly or forwardly a first distance away from the position of the focusing lens group L1 at which the maximum contrast value (P[PN-2]) is obtained in the case of a normal object image, whereas the credibility of the detected peak value (maximum value) of contrast is determined under less strict conditions with a contrast value (P[PN-6] or P[PN]) that is obtained at the position of the focusing lens group L1 which is rearwardly or forwardly a second distance (greater than the aforementioned first distance) away from the position of the focusing lens group L1 at which the maximum contrast value (P[PN-3]) is obtained in the case of a low-contrast object image.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A focus detection apparatus for detecting a focus state of an object image in accordance with a contrast of said object image, said focus detection apparatus comprising:
a lens system through which said object image is formed, said lens system including a focusing lens group movable along an optical axis thereof within a predetermined range of movement; and
a controller for detecting a contrast value of said object image at each of a plurality of different positions of said focusing lens group while moving said focusing lens group in a direction from one end to an other end of opposite ends of said range of movement;
said controller being configured to establish a first predetermined number and a first critical value when at least one of a maximum contrast value and a minimum contrast value among said contrast values respectively detected at said different positions of said focusing lens group by said controller is outside of a predetermined range based on maximum and minimum contrast values, and establishes a second predetermined number, which is greater than said first predetermined number, and a second critical value, which is less strict than said first critical value, when both said maximum contrast value and said minimum contrast value are within said predetermined range;

said controller being configured to compare contrast values detected at two adjacent positions of said focusing lens group with each other in said direction from said one end to said other end of said range of movement of said focusing lens group, wherein when said controller establishes said first predetermined number and said first critical value, said controller determines whether said contrast value of said object image increases once and subsequently decreases successively by a number of times equal to said first predetermined number, and when said controller establishes said second predetermined number and said second critical value, said controller determines whether said contrast value of said object image increases once and subsequently decreases successively by a number of times equal to said second predetermined number;

said controller detects said maximum contrast value when said controller determines that said contrast value of said object image increases once and subsequently decreases successively by a number of times equal to one of said first predetermined number and said second predetermined number;

wherein said controller determines a difference between said maximum contrast value and a contrast value detected at a position of said focusing lens group which is spaced from a position thereof at which said maximum contrast value is obtained by a distance corresponding to one of said first predetermined number and said second predetermined number in one of opposite directions spaced from said maximum contrast value; and wherein said controller selects said maximum contrast value when said difference exceeds one of said first critical value and said second critical value.

2. The focus detection apparatus according to claim 1, wherein said controller establishes said first predetermined number and said first critical value when a ratio of said difference to said maximum contrast value exceeds a predetermined value; and wherein said controller establishes said second predetermined number and said second critical value when said ratio is one of equal to and smaller than said predetermined value.

3. The focus detection apparatus according to claim 1, wherein said controller determines said difference between said maximum contrast value and said contrast value detected at a position of said focusing lens group which is spaced from said position thereof at which said maximum contrast value is obtained by said distance corresponding to one of said first predetermined number and said second predetermined number in one of forward and rearward directions spaced from said maximum contrast value; and wherein, when said difference exceeds one of said first critical value and said second critical value, said controller determines that a focused focal point exists one of at, and in the vicinity of, said position of said focusing lens group at which said maximum contrast value is obtained.

4. The focus detection apparatus according to claim 1, further comprising a motor and a lens drive mechanism for moving said focusing lens group stepwise when said lens drive mechanism is driven by said motor.

5. The focus detection apparatus according to claim 1, wherein said contrast of said object image is measured by an image pickup device.

6. A focus detection method for detecting a focus state of an object image in accordance with a contrast of the object image, the focus detection method comprising:

detecting a contrast value of the object image at each of a plurality of different positions of a focusing lens group while moving the focusing lens group in a direction from one end to the other end of opposite ends of a range of movement of the focusing lens group;

establishing a first predetermined number and a first critical value when at least one of a maximum contrast value and a minimum contrast value among the contrast values respectively detected at the different positions of the focusing lens group is outside of a predetermined range based on maximum and minimum contrast values, and establishing a second predetermined number which is greater than the first predetermined number and a second critical value, which is less strict than the first critical value, when both the maximum contrast value and the minimum contrast value are within the predetermined range;

comparing contrast values detected at two adjacent positions of the focusing lens group with each other in the direction from the one end to the other end of the range of movement of the focusing lens group, wherein when the first predetermined number and the first critical value are established, it is determined whether the contrast value of the object image increases once and subsequently decreases successively by a number of times equal to the first predetermined number, and when the second predetermined number and the second critical value are established, it is determined whether the contrast value of the object image increases once and subsequently decreases successively by a number of times equal to the second predetermined number;

detecting the maximum contrast value when it is determined that the contrast value of the object image increases once and subsequently decreases successively by a number of time equal to the one of the first predetermined number and the second predetermined number;

determining a difference between the maximum contrast value and a contrast value detected at a position of the focusing lens group which is spaced from a position thereof at which the maximum contrast value is obtained by a distance corresponding to one of the first predetermined number and the second predetermined number in one of opposite directions spaced from the maximum contrast value; and selecting the maximum contrast value when the difference exceeds one of the first critical value and the second critical value.

7. A focus detection method for detecting a focus state of an object image in accordance with a contrast of the object image, the focus detection method comprising:

detecting a contrast value of the object image at each of a plurality of different positions of a focusing lens group while moving the focusing lens group in a direction from one end to the other end of opposite ends of a range of movement of the focusing lens group;

establishing a predetermined number and a critical value when at least one of a maximum contrast value and a minimum contrast value among the contrast values respectively detected at the different positions of said focusing lens group is outside of a predetermined range based on maximum and minimum contrast values;

comparing contrast values detected at two adjacent positions of the focusing lens group with each other in the direction from the one end to the other end of the range of movement of the focusing lens group to determine whether the contrast value of the object image increases once and subsequently decreases successively a number of times equal to the predetermined number;

detecting the maximum contrast value when it is determined that the contrast value of the object image increases once and subsequently decreases successively by the number of times equal to the predetermined number;

determining a difference between the maximum contrast value and a contrast value detected at a position of the focusing lens group which is spaced from a position thereof at which the maximum contrast value is obtained by a distance corresponding to the predetermined number in one of opposite directions spaced from the maximum contrast value; and selecting the maximum contrast value when said difference exceeds the critical value.

8. A focus detection method for detecting a focus state of an object image in accordance with a contrast of the object image, the focus detection method comprising:

detecting a contrast value of the object image at each of a plurality of different positions of a focusing lens group while moving the focusing lens group in a direction from one end to the other end of opposite ends of a range of movement of said the focusing lens group;

establishing a predetermined number and a critical value in the case where when both a maximum contrast value and a minimum contrast value among said the contrast values respectively detected at the different positions of the focusing lens group are within a predetermined range based on maximum and minimum contrast values;

comparing contrast values detected at two adjacent positions of the focusing lens group with each other successively at consecutive positions of said focusing lens group in the direction from the one end to the other end of the range of movement of the focusing lens group to determine whether the contrast value of the object image increases once and subsequently decreases successively a number of times equal to the predetermined number;

detecting the maximum contrast value in the case where when it is determined that the contrast value of the object image increases once and subsequently decreases successively by the number of times equal to the predetermined number;

determining a difference between the maximum contrast value and a contrast value detected at a position of the focusing lens group which is spaced from a position thereof at which the maximum contrast value is obtained by a distance corresponding to the predetermined number in one of opposite directions spaced from the maximum contrast value; and selecting the maximum contrast value in the case where the difference exceeds the critical value.

\* \* \* \* \*